Patented Apr. 7, 1953

2,634,260

UNITED STATES PATENT OFFICE 2,634,260

METAL MOLYBDITE CATALYZED POLYMERIZATION

James E. Carnahan, New Castle, Del., assignor to E. I. du Pont de Nemours & Company, Wilmington, Del., a corporation of Delaware No Drawing. Application November 18, 1949,
Serial No. 128,235

11 Claims. (Cl. 260—93.7)

This invention relates to polymerization processes and more particularly to a novel catalytic polymerization process.

During recent years the field of polymers has attained major industrial stature and in consequence great emphasis has been given to catalysts for polymer preparation. Such catalysts fall into two general classes, namely, materials which function by yielding free radicals under the conditions of reaction and materials which operate through an ionic mechanism. Prototypes of the first class are the peroxy compounds, azo compounds, amine oxides, and the like. Typical ionic catalysts are sulfuric acid, hydrofluoric acid, boron trifluoride, aluminum chloride, and the like.

Many of the free-radical generating catalysts are deficient either because (a) they are hazardous to handle, (b) they are expensive, (c) the yield of polymer per unit weight of catalyst is not as high as is desired, (d) the reaction rate is low, or (e) the molecular weight of the product is often not in the desired range, or because of a combination of two or more of these shortcomings. The ionic type catalysts introduce corrosion problems and in many cases are deficient in activity.

It is an object of this invention to provide an improved process for the polymerization of polymerizable organic compounds. A further object is to provide a process in which the polymerization of polymerizable organic compounds capable of addition polymerization across an ethylenic double bond is effected by a new type of catalyst. A still further object is to provide a novel catalytic process for the polymerization of polymerizable organic compounds which offers many advantages over polymerization processes utilizing prior catalysts. Other objects will appear hereinafter.

The objects of this invention are accomplished by a process for the polymerization of a polymerizable organic compound which comprises contacting said polymerizable organic compound with a molybdite of a metal whose ions are soluble in excess aqueous ammonia, that is whose ions are soluble in aqueous ammonia in amount greater than that stoichiometrically required to precipitate the metal ion. This invention accordingly provides an improved process for the polymerization of polymerizable organic compounds, the improvement residing in effecting polymerization in the presence of a molybdite of a metal whose ions are not precipitated as insoluble oxides or hydroxides when solutions of their salts are treated with excess aqueous ammonia. A new type of catalyst for the polymerization of organic compounds capable of addition polymerization across an ethylenic double bond has been found in these molybdites, to be more fully described subsequently, which offers many advantages over prior catalysts.

In practice the metal molybdite is charged into a reactor provided with agitating and heating means. The polymerizable organic compound is placed in the reactor, and heating and agitation are started. The reaction mixture is maintained at the temperature selected for the polymerization for from 1 to 10 hours, after which time the reactor is permitted to cool, the contents removed, and the products separated by fractionation or other means known to those skilled in the art.

The examples which follow are submitted to illustrate and not to limit this invention.

Example I

A 400 ml. shaker tube was charged with 100 g. (1.8 moles) of isobutylene and 5.0 g. of nickel molybdite catalyst, prepared as described below. This mixture was heated with shaking at 200° C. under autogenous pressure for 5 hours. The product was rinsed from the tube with ether, freed from catalyst by filtration and then fractionated. The yield was 84 g. (84% conversion) of liquid polyisobutylenes boiling principally in the range 103° C./1 atm. to 155° C./20 mm. On the basis of boiling range data the product appeared to be one-fourth dimers, one-half trimers and the remainder tetramers or higher polymers.

Analysis:
Found: C=86.2%, H=14.4%.
Calc'd for $C_nH_{2n}$, C=85.6%, H=14.4%.

The catalyst used in obtaining this result was prepared as follows:

Seventeen hundred sixty-six grams of ammonium paramolybdate [$(NH_4)_6Mo_7O_{24}.4H_2O$], equivalent to 10 moles of $MoO_3$, was dissolved in 5000 cc. of distilled water and neutralized by the addition of 900 cc. of 28% aqueous ammonia. The resulting solution of ammonium molybdate

[$(NH_4)_2MoO_4$]

containing 1.9 moles excess ammonia was then added with stirring, at room temperature, to a solution of nickel nitrate, prepared by dissolving 2908 g. of nickel nitrate hexahydrate

[$Ni(NO_3)_2.6H_2O$]

equivalent to 10 moles of nickel salt, in 5000 cc. of distilled water. A pale green precipitate was formed in an acid slurry having a pH of approximately 4.0, as determined by alkaline-acid paper. The pH of the slurry was adjusted to 7.0 (Beckmann pH meter) by the addition of 500 cc. of 28% aqueous ammonia. The precipitate was then washed, filtered, dried, and calcined at 400° C. for 18 hours. The calcined product, by analysis, was found to contain 23.2% nickel and 46.4% molybdenum.

The calcined product, prepared as described above, was reduced in hydrogen at gradually increasing temperatures up to 550° C. for a total of 25 hours, of which period 18 hours was at 550° C. The reduced product was highly pyrophoric and glowed on exposure to air. Analysis of the reduced material showed it to contain 26.66% nickel and 53.1% molybdenum corresponding to $NiMoO_2/0.1\ Mo_2O_3$.

*Example II*

Example I was repeated except that the temperature was held at 50° C. With this change, a mixture of liquid polyisobutylenes was obtained in 95% conversion. On the basis of boiling range data, the product appeared to be 7% dimers, 45% trimers, and 48% tetramers or higher polymers.

*Example III*

A 400 ml. shaker tube was charged with 168 g. (3.0 moles) of isobutlyene and 10 g. of cobalt molybdite catalyst which was prepared by a method analogous to that described for nickel molybdite in Example I. This mixture was heated with shaking at 200° C. under autogenous pressure for 4 hours. The yield as 24 g. (14% conversion) of dimeric isobutylenes boiling in the range 100–104° C.

*Example IV*

In a 400 ml. shaker tube, 112 g. (2.0 moles) of isobutylene and 5.0 g. of copper molybdite catalyst, which was prepared in a manner analogous to that described for nickel molybdite in Example I, were heated together at 200° C. under autogenous pressure for 4 hours. The resulting product was 69 g. (62% conversion) of polyisobutylenes boiling principally in the range 100–178° C. On the basis of boiling range data, the product appeared to be 48% dimers, 39% trimers and 13% tetramers or higher polymers.

*Example V*

In a 400 ml. shaker tube, 112 g. (2.0 moles) of isobutylene and 5.0 g. of zinc molybdite catalyst, which was prepared in a manner analogous to that described for nickel molybdite in Example I, were heated together at 200° C. under autogenous pressure for 4 hours. The resulting product amounted to 25 g. (22% conversion) of polyisobutylenes which appeared to be 63% dimers and 37% trimers or higher polymers as judged by boiling range data.

*Example VI*

A 400 ml. shaker tube was charged with 168 g. (4.0 moles) of propylene and 5.0 of nickel molybdite catalyst which was prepared according to Example I. This mixture was heated with shaking at 200° C. under autogenous pressure for 5 hours. The yield was 20 g. (12% conversion) of liquid polypropylenes boiling in the range 55–71° C.

Analysis:
 Found, C=85.5%, H=14.5%.
 Calculated for $C_nH_{2n}$, C=85.6%, H=14.4%.

*Example VII*

A 400 ml. shaker tube was charged with 140 g. (1.25 moles) of 1-octene and 10 g. of nickel molybdite catalyst which was prepared according to Example I. This mixture was heated with shaking at 200° C. under autogenous pressure for 3 hours. Of the product recovered, 106 g. was fractionated. After taking off the foreshot, which consisted of 49 g. of isomeric octenes boiling at 118–123° C., there was collected 48 g. (45%) of dimeric octenes which boiled at 140–149° C./20 mm.

Analysis:
 Found, C=85.6%, H=14.2%.
 Calculated for $C_nH_{2n}$, C=85.6%, H=14.4%.

The above experiment was duplicated, except that the catalyst was omitted. Under these conditions 1-octene was recovered unchanged.

*Example VIII*

A mixture of 100 g. of methyl methacrylate, 0.1 g. of hydroquinone, and 5 g. of nickel molybdite catalyst, prepared as described in Example I, was placed in a closed reactor and the mixture heated at 200° C. for 4 hours with agitation. The reaction mixture was allowed to cool. A solid mass of polymer was obtained when the cooled reactor was opened.

*Example IX*

A mixture of 50 g. of commercial styrene, 1 g. of nickel molybdite catalyst, prepared as described in Example I, and 20 ml. of methanol was stirred and heated at 60–70° C. for 5 hours under an atmosphere of nitrogen. After cooling, the viscous liquid was filtered to separate the catalyst, giving a clear, water white viscous filtrate. On adding a portion of this filtrate to a large volume of methanol with rapid stirring, a white solid polymer separated which was isolated by filtration.

Although in the above examples certain specific polymerizable organic compounds have been used, it is to be understood that the improved polymerization process of this invention is applicable to any polymerizable organic compound.

By "polymerizable organic compound" is meant compounds containing the group $>C=C<$, and which, in accordance with the present state of the art, are recognized as being capable of undergoing a polymerization reaction involving addition across the ethylenic double bond, which reaction is catalyzed by peroxy compounds. These polymerizable organic compounds are ethylenically unsaturated organic compounds capable of undergoing addition polymerization. A class of these compounds embraces aliphatic olefin hydrocarbons, such as, ethylene and butadiene; vinyl and vinylidene compounds, such as, vinyl chloride, vinyl flouride, vinyl acetate, vinyl propionate, vinyl acetate, vinyl benzoate, vinyl trimethyl acetate, vinyl isobutyrate, methyl vinyl ketone, methyl isopropenyl ketone, styrene, methyl acrylate, acrylonitrile, etc., vinylidene chloride, vinylidene fluoride, methacrylonitrile, methyl methacrylate, and the like; allyl compounds, such as, diallyl phthalate, allyl vinyl ether, etc.; vinylene compounds, such as, maleic anhydride, and maleic and fumaric acids and their esters, etc. Combinations of two or more polymerizable organic compounds are particularly useful for polymerization with the catalysts of this invention. Especially useful are the monoolefin hydrocarbons containing up to 10 carbon atoms for example, ethylene, propylene, butylenes, hexylenes, octenes, and decenes because they yield liquid polymers of particular value as liquid fuels for internal combustion engines.

In many cases the polymerization proceeds smoothly under the autogenous pressure developed at the temperature selected for effecting the polymerization. If desired and/or needed to speed up the rate of reaction superpressures, which may range from 100 lb./sq. in. to the maximum permitted by the structural limitations of the equipment, may be used.

The time of reaction depends not only upon the temperature at which the polymerization is being effected but also upon the polymerizable organic compound undergoing polymerization. As a rule, the reaction is continued as long as there is evidence that polymerization is occurring, as indicated by continued pressure drop in the case of gaseous monomers. Generally, however, periods of time varying from 1 to 10 hours are used under the preferred temperature conditions, because within this range a balance is obtained between yield of desired polymer and economy of operation.

The catalysts used in the practice of this invention are the metal molybdites disclosed and claimed in the co-pending application of H. R. Arnold and J. E. Carnahan, U. S. Serial No. 111,982, filed August 23, 1949, now Patent No. 2,572,300, issued October 23, 1951, of which the present application is a continuation-in-part. These molybdites exist in two series, in the first of which the molybdenum is present in the quadrivalent state corresponding to the oxide $MoO_2$ and the hypothetical acid $H_2MoO_3$, while in the second series the molybdenum exists in the bivalent state corresponding to the oxide $MoO$ and the hypothetical acid $H_2MoO_2$. Preferred molybdites, because of their high degree of activity, are nickel molybdite having the formula $NiMoO_2$, cobalt molybdite having formulas corresponding to $CoMoO_3$ and $CoMoO_2$, zinc molybdite having the formula $ZnMoO_3$ and copper molybdite having the formula $CuMoO_3$. These molybdites may be employed in the form of pellets or as finely divided powders. The particular physical form of the catalyst for maximum activity depends upon the conditions under which the polymerization reaction is to be effected. Thus, for vapor or liquid phase continuous operation it is best to have the catalyst in the form of pellets, thus minimizing mechanical losses. If the process, however, is to be operated as a batch operation, it is best that the catalyst be in finely divided form because in this way maximum catalytic activity is attained.

The amount of catalyst employed depends upon such interdependent variables as temperature, desired duration of contact, and general method of operation; that is, whether the process is to be operated as a vapor or liquid phase continuous operation or batchwise. As a rule, the amount of catalyst used is at least 1% by weight of the polymerizable organic compound or compounds in the charge. Amounts of catalyst above 15% by weight of the polymerizable organic compound or compounds are not employed in batch operations because no practical advantages accrue therefrom. The amount of catalyst normally employed in batch operation ranges between 3 and 7% by weight of the polymerizable organic compound or compounds because good yields of desired polymers are obtained at a practical reaction rate. In a continuous process, the amount of catalyst employed would normally exceed the weight of the polymerizable organic compound in contact with it at a given instant but the exact ratio is dependent upon the space-velocity and temperature chosen for operation.

Although the polymerization can be effected at temperatures within the range of 0° to 450° C., best results from the standpoint of yield of desired polymers and reaction rates are obtained in the range of 50° to 300° C. The process is therefore generally operated within the range.

The use of an added reaction medium is not essential to operability. The use of such a reaction medium is sometimes desirable to aid in the dissipation of the heat of reaction. As reaction media for selected polymerizations there may be used water or any non-polymerizable, normally liquid, preferably volatile organic compound. Examples, are isooctane, cyclohexane, dioxane, methyl formate, acetone, etc.

The properties of the polymers obtained in accordance with the process of this invention vary widely depending on the polymer components, the particular molybdite catalyst, and the reaction temperature and pressure used. The liquid polymers obtained from normally gaseous lower monoolefins are particularly useful, after hydrogenation, as premium motor fuels, and as blending agents for improving the anti-knock value of standard gasoline fractions. The unhydrogenated products are useful as solvents for coating compositions and as intermediates in reactions based on specific monoolefin fractions.

The catalysts used in the practice of this invention are easily regenerated, noncorrosive, non-explosive, and give high yields of polymer per unit weight of catalyst employed. They therefore represent a marked advance in the polymerization art.

As many apparently widely different embodiments of this invention may be made without departing from the spirit and scope thereof, it is to be understood that this invention is not limited to the specific embodiments thereof except as defined in the appended claims.

I claim:

1. In a process for the polymerization of an ethylenically unsaturated polymerizable organic compound containing an ethylenic double bond as the sole aliphatic carbon-to-carbon unsaturation and which is capable of undergoing addition polymerization across an ethylenic double bond in the presence of a peroxy catalyst, the improvement which comprises polymerizing said ethylenically unsaturated polymerizable compound in contact with a molybdite of a metal whose ions are soluble in aqueous ammonia in amount greater than that stoichiometrically required to precipitate the metal ion, said metal molybdite being a metal salt of an acid selected from the class consisting of the acid having the formula $H_2MoO_3$ and the acid having the formula $H_2MoO_2$.

2. In a process for the polymerization of an ethylenically unsaturated polymerizable aliphatic compound or up to 10 carbon atoms containing an ethylenic double bond as the sole carbon to carbon unsaturation and which is capable of undergoing addition polymerization across the ethylenic double bond in the presence of a peroxy catalyst, the improvement which comprises polymerizing said ethylenically unsaturated polymerizable aliphatic compound in contact with a molybdite of a metal whose ions are soluble in aqueous ammonia in amount greater than that stoichiometrically required to precipitate the metal ion, said metal molybdite being a metal salt of an acid selected from the class consisting of the acid having the formula $H_2MoO_3$ and the acid having the formula $H_2MoO_2$.

3. In a process for the polymerization of an ethylenically unsaturated polymerizable aliphatic hydrocarbon compound of up to 10 carbon atoms containing an ethylenic double bond as the sole aliphatic carbon-to-carbon unsaturation and which is capable of undergoing addition polymerization across an ethylenic double bond in the presence of a peroxy catalyst, the improvement which comprises polymerizing said ethylenically unsaturated polymerizable aliphatic hydrocarbon compound in contact with a molybdite of a metal whose ions are soluble in aqueous ammonia in amount greater than that stoichiometrically required to precipitate the metal ion, said metal molybdite being a metal salt of an acid selected from the class consisting of the acid having the formula $H_2MoO_3$ and the acid having the formula $H_2MoO_2$.

4. In a process for the polymerization of an ethylenically unsaturated polymerizable hydrocarbon compound of up to 10 carbon atoms containing one ethylenic double bond as the sole aliphatic carbon-to-carbon unsaturation and which is capable of undergoing addition polymerization across the ethylenic double bond in the presence of a peroxy catalyst, the improvement which comprises polymerizing said ethylenically unsaturated polymerizable hydrocarbon compound in contact with a molybdite of a metal whose ions are soluble in aqueous ammonia in amount greater than that stoichiometrically required to precipitate the metal ion, said metal molybdite being a metal salt of an acid selected from the class consisting of the acid having the formula $H_2MoO_3$ and the acid having the formula $H_2MoO_2$.

5. In a process as set forth in claim 1 wherein said molybdite is nickel molybdite having the formula $NiMoO_2$.

6. In a process as set forth in claim 1 wherein said molybdite is a cobalt molybdite having one of the formulas corresponding to $CoMoO_2$ and $CoMoO_3$.

7. In a process as set forth in claim 1 wherein said molybdite is copper molybdite having the formula $CuMoO_3$.

8. In a process as set forth in claim 1 wherein said molybdite is zinc molybdite having the formula $ZnMoO_3$.

9. In a process for the polymerization of isobutylene, the improvement which comprises polymerizing said isobutylene in contact with a molybdite of a metal whose ions are soluble in aqueous ammonia in amount greater than that stoichiometrically required to precipitate the metal ion, said metal molybdite being a metal salt of an acid selected from the class consisting of the acid having the formula $H_2MoO_3$ and the acid having the formula $H_2MoO_2$.

10. In a process for the polymerization of isobutylene, the improvement which comprises polymerizing said isobutylene in contact with nickel molybdite having the formula $NiMoO_2$.

11. In a process for the polymerization of 1-octene, the improvement which comprises polymerizing said 1-octene in contact with nickel molybdite having the formula $NiMoO_2$.

JAMES E. CARNAHAN.

REFERENCES CITED

The following references are of record in the file of this patent:

UNITED STATES PATENTS

| Number | Name | Date |
|---|---|---|
| 2,393,288 | Byrns | Jan. 22, 1946 |
| 2,487,564 | Layng | Nov. 8, 1949 |